US007011436B2

(12) United States Patent
Riebling et al.

(10) Patent No.: US 7,011,436 B2
(45) Date of Patent: Mar. 14, 2006

(54) IN-GRADE LIGHT FIXTURE WITH HYDRAULIC ISOLATION

(75) Inventors: Michael L. Riebling, Hanover, PA (US); David A. Smith, Littlestown, PA (US); William M. Niemier, Hanover, PA (US); Adam Clark, Bradenton, FL (US)

(73) Assignee: Genlyte Thomas Group, LLC, Louisville, KY (US)

( * ) Notice: Subject to any disclaimer, the term of this patent is extended or adjusted under 35 U.S.C. 154(b) by 0 days.

(21) Appl. No.: 10/446,267

(22) Filed: May 23, 2003

(65) Prior Publication Data

US 2004/0145899 A1 Jul. 29, 2004

Related U.S. Application Data

(60) Provisional application No. 60/443,130, filed on Jan. 28, 2003.

(51) Int. Cl.
*B60Q 1/00* (2006.01)

(52) U.S. Cl. ...................... 362/487; 362/267; 362/226; 362/365

(58) Field of Classification Search ................ 362/487, 362/153.1, 364, 267, 265, 226, 365; 174/52.2, 174/65 R; 404/9, 11
See application file for complete search history.

(56) References Cited

U.S. PATENT DOCUMENTS

| | | | |
|---|---|---|---|
| 1,057,178 | A | 3/1913 | Sessions |
| 1,228,155 | A | 5/1917 | Williams |
| 1,611,651 | A | 12/1926 | Leavitt |
| 2,247,671 | A | 7/1941 | Tepel |
| 2,877,288 | A | 3/1959 | Bollmeier |
| 3,339,066 | A | 8/1967 | Hart |
| 3,879,575 | A | 4/1975 | Dobbin et al. |
| 4,266,659 | A | 5/1981 | Meyer et al. |
| 4,433,776 | A | 2/1984 | Edwards, Jr. et al. |
| 4,539,629 | A | 9/1985 | Poppenheimer |
| 4,548,316 | A | 10/1985 | Maurer |
| 4,574,337 | A | 3/1986 | Poppenheimer |
| 4,610,738 | A | 9/1986 | Jervis |
| 4,695,930 | A | 9/1987 | Wierzbicki et al. |
| 4,872,548 | A | 10/1989 | Masuda et al. |
| 4,907,139 | A | 3/1990 | Quiogue |
| 4,931,914 | A | 6/1990 | Quiogue |
| 4,931,915 | A | 6/1990 | Quiogue |
| 4,947,307 | A | 8/1990 | Quiogue |
| 4,998,894 | A | 3/1991 | Gronvall |
| 4,999,757 | A | 3/1991 | Poppenheimer |
| 5,029,056 | A | 7/1991 | Patterson, Jr. |
| 5,041,950 | A | 8/1991 | Tyson |
| 5,075,834 | A | 12/1991 | Puglisi |

(Continued)

*Primary Examiner*—Sandra O'Shea
*Assistant Examiner*—Bertand Zeade
(74) *Attorney, Agent, or Firm*—James E. Cole; Middleton Reutlinger

(57) ABSTRACT

An in-grade light fixture is described herein. The in-grade light fixture has a main housing having an open top end with a lens covering the open top end. A side car splice compartment is adjacent to the lens along an upper portion of the housing. A hydraulic isolation chamber extends vertically downward from the splice compartment to a receptacle which is an electrical connection to a lamping module contained within the housing. A ballast may be utilized for proper supply of power to the lamp if a non-incandescent lamp is utilized. The hydraulic isolation chamber is filled with the potting material and prevents wicking of moisture through the receptacle into the main housing.

10 Claims, 3 Drawing Sheets

U.S. PATENT DOCUMENTS

| | | | |
|---|---|---|---|
| 5,124,902 | A | 6/1992 | Puglisi |
| 5,198,962 | A | 3/1993 | Tyson |
| 5,276,583 | A | 1/1994 | Tyson |
| RE34,709 | E | 8/1994 | Tyson |
| 5,349,505 | A | 9/1994 | Poppenheimer |
| 5,408,397 | A | 4/1995 | Tyson |
| 5,481,443 | A | 1/1996 | Wagner et al. |
| 5,483,428 | A | 1/1996 | Poppenheimer |
| 5,486,988 | A | 1/1996 | Tyson |
| 5,556,188 | A | 9/1996 | Poppenheimer |
| 5,567,170 | A | 10/1996 | Kroeber |
| 5,727,873 | A | 3/1998 | Tyson |
| 5,743,622 | A | 4/1998 | Ibbitson et al. |
| 5,779,349 | A | 7/1998 | Reinert |
| 5,887,966 | A | 3/1999 | Eissner et al. |
| 5,908,236 | A | 6/1999 | Lueken et al. |
| 6,068,384 | A | 5/2000 | Tyson et al. |
| 6,088,875 | A | 7/2000 | Ono et al. |
| 6,165,013 | A | 12/2000 | Broussard |
| 6,175,487 | B1 | 1/2001 | McCartney et al. |

IN-GRADE LIGHT FIXTURE WITH HYDRAULIC ISOLATION

CROSS-REFERENCE TO RELATED APPLICATIONS

This application claims the benefit of U.S. Provisional Application No. 60/443,130, filed Jan. 28, 2003.

TECHNICAL FIELD

The present invention relates to in-grade luminaires which hydraulically isolate the main fixture housing from the junction box to prevent water seepage into the electronics of the fixture. Water entry into an in-ground luminaire must be prevented since such seepage can prevent the electronics from proper operation. Water can enter through incorrect seals, cracked or old seals, wicking through the wiring, or by other means.

DETAILED DESCRIPTION OF THE PREFERRED EMBODIMENTS

Figure 1:
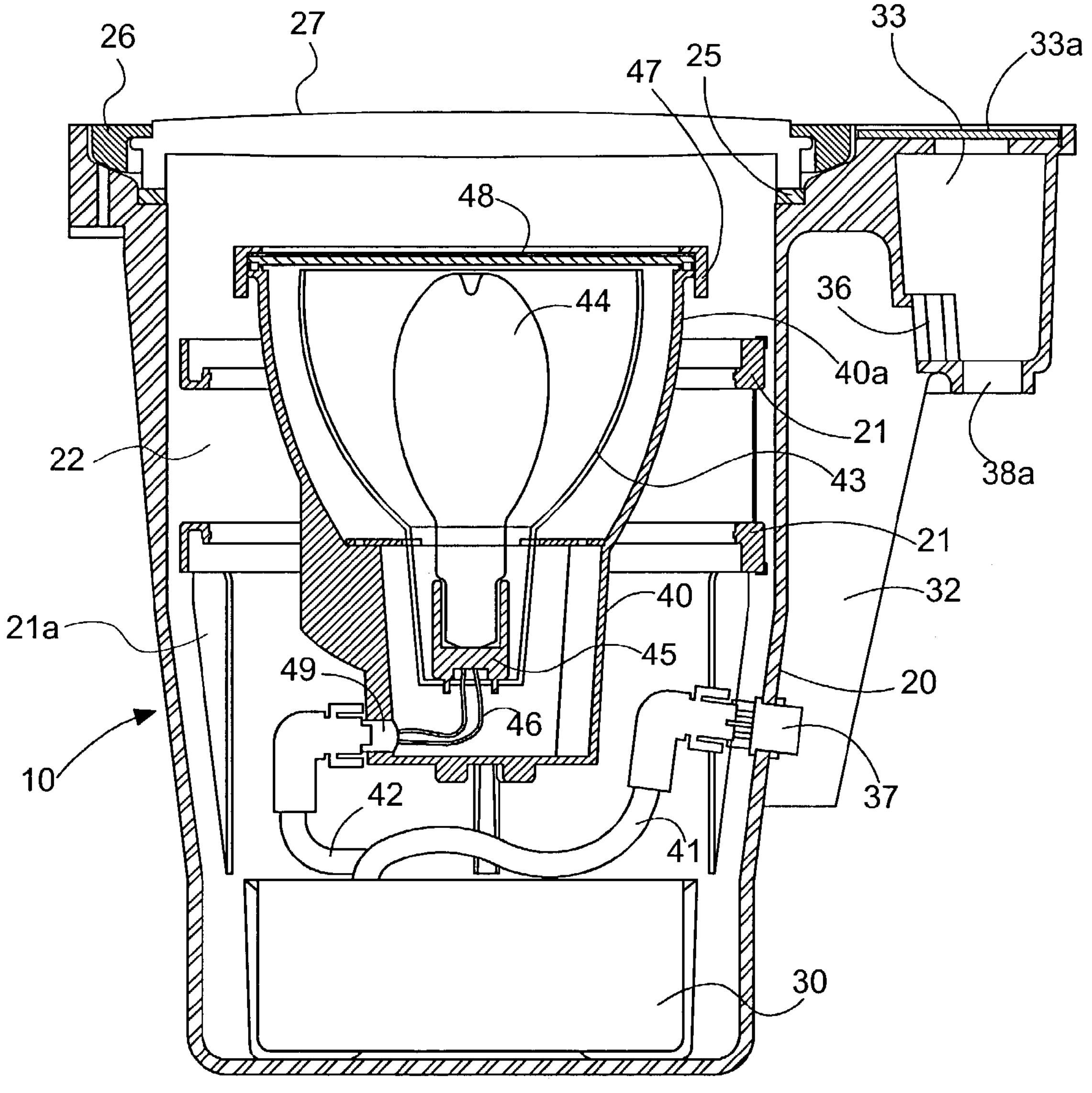
FIG. 1 is a side sectional view of the in-grade light fixture of the present invention.

The in-grade light fixture 10 of the present invention is depicted in FIG. 1 wherein the main housing 20 is provided which contains a lamping module 40 and ballast module 30, if required in main compartment 22. A side car junction box or splice compartment 33 is provided for electrical connection of the power supply wires from the external source to the internal wiring for the in-grade fixture 10 of the present invention. Interposed between the side car junction box 33 and the main housing 20 is an hydraulic isolation chamber 32 which extends vertically therebetween and which may be deemed a potting compartment for hydraulic isolation of the junction box, the wires contained therein and between the internal portion of the housing 20.

As may be readily seen from the figures, and in particular referring to FIG. 1, the side car junction box or splice compartment 33 has an opening on an upper portion thereof, the opening positioned so that the cover 33*a* is at ground level adjacent to the lens 27 of the main housing 20 of the in-grade fixture 10. The side car junction box 33 has cover 33*a* for proper sealing of the junction box or splice compartment 33 from external moisture and may be sealed after the wires from the external power supply are electrically connected with the power supply wires 38, shown in FIG. 2, for the in-grade fixture 10 of the present invention. The side car junction box 33 has a conduit entry 38*a* allowing external wires to enter into the side car junction box for joining with the internal electrical wires 38. The side car junction box 33 has an internal splice compartment which is removed from the main compartment 22 thereby preventing water leakage between the two compartments.

The side car junction box, as indicated, has a cover 33*a* over the opening which is at ground level and adjacent to the lens 27. External wires may be fed into the side car junction box 33 for direct connection to the wires 38. Also located within the side car junction box 33 may be encapsulant material for sealing of the side car junction box after splicing of the external wires to internal wires 38. The encapsulant may surround and seal the wire connections and conduit entry points. The encapsulant utilized may remain a viscous liquid, gelatinous consistency or cure to a rubber or solid material such as RTV silicate. Once the wires are electrically connected, the encapsulant may be poured into the side car junction box and the cover 33*a* may be placed thereon to assure that no water leaks from the side car junction box into the hydraulic isolation chamber 32. Potting dam 36 is provided for allowing the internal wires 38 into the side car junction box and extending downward through the hydraulic isolation chamber 32 to the receptacle 37.

Figure 2:
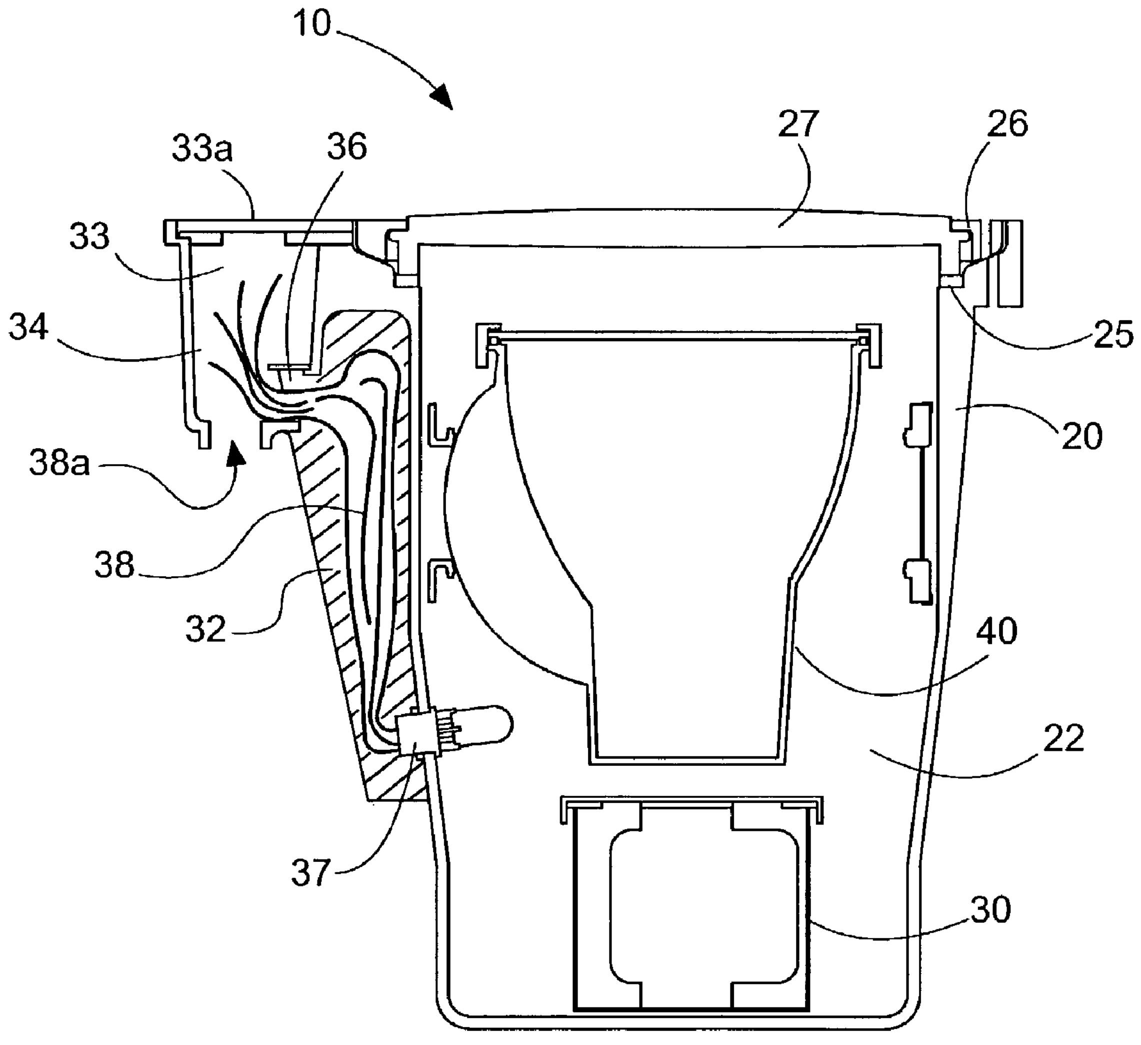
FIG. 2 is a partial side sectional view of the in-grade luminaire of the present invention.

In the design of the in-grade light fixture 10 of the present invention, the hydraulic isolation chamber 32 extends vertically between the side car junction box or splice compartment 33 to a receptacle 37 extending through the wall of the housing 20 providing electrical connectivity to the internal components of the in-grade fixture 10. The hydraulic isolation chamber 32 is provided such that the wires 38 extending therethrough are surrounded by a potting compound which cures to a hard plastic. By placing a potting compound into the hydraulic isolation chamber 32, the potting material seals the side car junction box 33 and main housing 20 from moisture originating from the other compartments and from outside of the fixture 10. Prior to placement of the potting material within the hydraulic isolation chamber 32, the wires 38, as shown in FIG. 2, are placed so as to extend through the vertically extending hydraulic isolation chamber and electrically connected to a pin interface of the receptacle 37 facing the interior of the hydraulic isolation chamber 32. Thus, the wires 38 extend from the side car junction box 33 to the receptacle 37 but do not extend into the interior of the housing 20. The vertically extending hydraulic isolation chamber 32 therefore adequately isolates the side car junction box 33 and wires 38 from the internal electrical components of the light fixture 10 found within the housing 20.

The receptacle 37, as indicated, may have an exposed pin interface facing the interior of the hydraulic isolation chamber 32 for electrical connection of the wires 38. The liquid tight receptacle 37, such as a Brad Harrison Mini-Change brand or equivalent, is installed in the hydraulic isolation chamber and extends through the side wall into the interior of the main compartment 22. Once the wires 38 extend through the hydraulic isolation chamber 32 and are affixed to the receptacle 37, potting material or terminal block may be placed into the hydraulic isolation chamber to seal the compartments against moisture and prevent wicking through the wires into the main compartment 22. The entire hydraulic isolation chamber 32 is filled with the potting material and the material fully surrounds the pin wire interfaces thereby preventing any moisture from progressing beyond the receptacle 37 even should water wick through the wires 38 to the receptacle assembly 37. With the wires crimped to pins on the interior side of the receptacle 37, a water tight barrier is placed between the hydraulic isolation chamber 32 and the main compartment 22. Thus the electrical leads to which the wires 38 are crimped to extend through the receptacle assembly in such a manner that a water tight barrier is formed therewith.

As indicted, the potting material surrounds the pin wire interface of the receptacle 37 thereby preventing any moisture from progressing beyond the receptacle. Additionally, the potting material will set in place and harden around the wires and around the potting dam 36 to prevent moisture entry into the hydraulic isolation chamber 32 thereby further assuring the material maintains outside of the housing 22. The splice compartment or side car junction box 33 therefore is maintained in moisture free condition by the presence of the encapsulate, the sealed cover 33*a* on the top opening thereof, the potting dam 36 and potting material set within the potting compartment or hydraulic isolation chamber 32. Any moisture therefore is prevented by entry into the main compartment 22.

Within the main compartment 22 is found the ballast module 30, wires 41 and 42 for electrical connection and the lamping module 40. The main compartment 22 is sealed at an open upper end by the lens 27 which has lens ring 26 and lens gasket 25. The lens is in sealing engagement with the housing 20 by use of the gasket 25 and ring 26 thereby preventing any moisture from entering into the main compartment 22.

Within the main housing 22 is placed the lamping module 40. The lamping module 40 may be placed on a gimball mechanism to provide, for example, up to 15° of tilt and 360° of rotation. The upper and lower gimball rings 21 and mechanism may be similar to that as disclosed in U.S. Pat. No. 5,481,443, incorporated herein by reference, and may utilize supporting ribs 21*a* which contact the lamping module for directional adjustment of the module 40.

The lamping module 40 is comprised of a reflector 43, lamp 44, lamp socket 45, the lamp socket being electrically connected by socket wires 46 to the socket receptacle 49. Within the lamping module, the lamp, which may be either incandescent, fluorescent or HID, emits appropriate light reflected by the reflector 43, if present, through the lamping module lens 48 which then provides illumination through the lens 27 of the housing 20. By separating the lamping module 40 from the remaining electronics and construction of the in-grade fixture 10 of the present invention, relamping of the fixture 10 becomes a relatively easy task. Removal of the exterior lens 27 by removal of the lens ring 26 allows an operator to remove the entire lamping module and replace it without having to enter into any of the other sealing mechanism provided within the in-grade fixture 10 as described herein.

The lamping module 40 as depicted has a lamping module lens 48 at a top open end thereof which is not in sealing engagement with the upper portion 40*a* of the lamping module. There is no need to provide a sealing engagement between the lamping module lens and the upper portion 40*a* since the main compartment 22 of the housing 20 is provided in a moisture free environment through use of the hydraulic isolation chamber 32 described herein. Thus, the main compartment 22 is maintained in a dry environment through the use of the hydraulic isolation chamber 32 and the lens gasket 25 and lens ring 26. Thus, the lamp module lens 48 is not sealed with the lamp module since a moisture free environment within the main compartment 22 is assured.

The lamping module 40 has socket receptacle 49 which is in electrical communication with the ballast module 30 through the lamp wire 42. The ballast module 30 is provided for HID lamps and will not be required for incandescent or fluorescent lamps. The ballast module 30 is in further electrical communication to the receptacle 37 by ballast wire 41, the wires 41 and 42 may have moisture resistant boots at the ends adjacent to the receptacles. The ballast module 30 itself is placed at the bottom of the main compartment 22 and may be mechanically retained in place. The ballast module 30, having a number of electronics located therein, may be a brick ballast module in that it may be filled with potting material encasing the interior of the ballast module to assure continued moisture free environment of the electronics placed therein. The wires 41 and 42 enter directly into the ballast module and through the potting material to the electronics as necessary. Alternatively, a ballast will be provided in the lamping module for fluorescent lamp designs.

Figure 3:
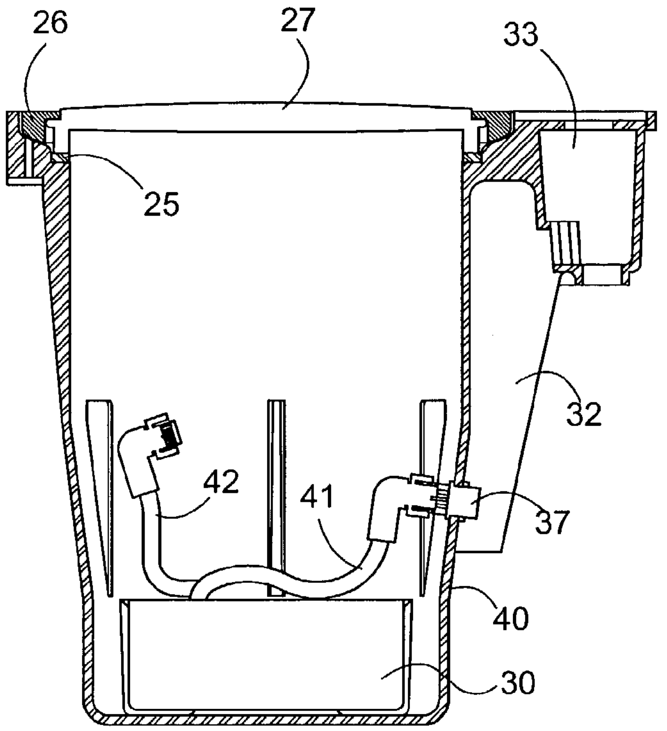
FIG. 3 is a side sectional view of the main housing and ballast compartment for the in-grade luminaire of the present invention; and, FIG. 4 is a side sectional view of the lamping module for use with in-grade luminaire of the present invention.

As shown in FIG. 3, the ballast module 30 may be retained at the bottom of the main housing 22 through mechanical means or may be placed in adhesive relationship with the bottom wall of the main housing or merely placed thereon. Upon assembly, the ballast module is inserted at the bottom of the main housing 22 and the wires 41 and 42 may be placed appropriately in the receptacles before installation of the lamping module 40.

One benefit of the design of the in-grade fixture 10 of the present invention is such that the vertically extending hydraulic isolation chamber 32 and the crimping of the wires extending therethrough to the receptacle 37 adequately isolates the main housing 22 from water seepage. As is known in the art, water may seep into the interior of the main housing 22 around the lens 27 facing the exterior environment or may seep into the main housing 22 by wicking or water seepage through the junction box. By isolating the wires through the receptacle 37 and potting compartment 32, a hydraulic barrier is presented which allows for electrical communication through the receptacle 37 to the exterior of the main housing 22 while preventing any moisture from entering therein. The gasket 25 may be a silicone gasket which contacts the fixture housing and the glass lens. The lens ring 26 may be a brass or stainless steel lens ring which is secured to the housing by screws and presses the lens against the gasket forming a moisture tight seal preventing leakage into main compartment 22.

Figure 4:
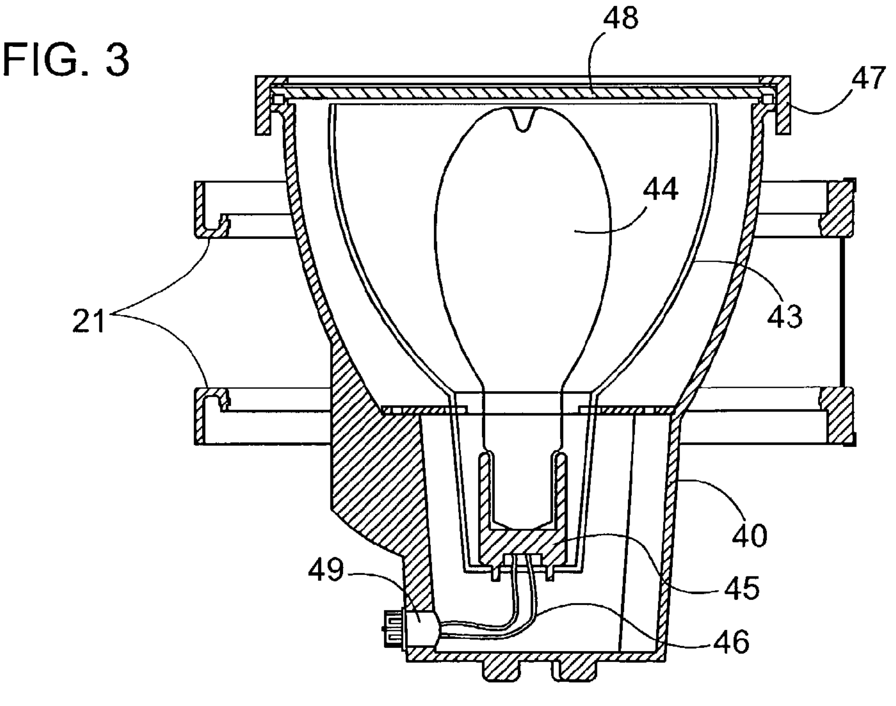

By utilization of the design of the presently described in-grade light fixture 10 of the present invention, the moisture free seal is assured through the potting compartment or hydraulic isolation chamber 32 between the side car junction box 33 and the main housing compartment 22. Therefore, moisture is prevented form entering into the main compartment 22 through wicking or other leaking mechanism and also prevented from entering into the lamping module 40, shown also in FIG. 4. Water ingress is prevented through the use of the potting material encasing the wire conduits extending through the chamber 32 and also utilizing the potting material surrounding the crimped wires at the receptacle 37 to prevent wicking therethrough. The hydraulic isolation chamber 32 may be set with the potting material prior to shipment of the combined fixture so that no additional entry into the hydraulic isolation chamber 32 is required upon installation of the in-grade fixture 10. Upon installation, the installer merely has to connect the wires at the side car junction box 33, fill the junction box with the proper encapsulant and place the cover 33*a* over the junction box. The encapsulant will then properly seal the potting compartment or hydraulic isolation chamber 32 and prevent additional moisture from entering into the interior of chamber 32 or the main housing 22.

It is apparent that variations may be made to the in-grade light fixture of the present invention in regards to placement of the hydraulic isolation chamber 32 in relation to the main housing 22 in order to assure a proper hydraulic isolation between the side car junction box and the main housing. Such variations however are deemed to fall within the teachings of the present invention as generally modifications may be made to placement of the particular structure described herein while falling within the general teachings hereof.

We claim:

1. An in-grade light fixture, comprising:

a housing having an upper end covered by a lens in sealing engagement with said housing;

a side car junction box adjacent said lens and having an upper end covered by a junction box cover in sealing engagement with said side car junction box;

a vertically extending hydraulic isolation chamber in pathway communication with said side car junction box and extending to a lower end of said housing and further having a receptacle extending through said housing and having a pin interface exposed to said vertically extending hydraulic isolation chamber;

a lamping module retained within said housing and having a top open end covered by a lamping module lens, said lamping module further having a lamp socket, lamp and reflector surrounding said lamp;

a ballast box within said housing in electrical communication with said lamp socket and said receptacle in said vertically extending hydraulic isolation chamber;

said side car junction box cover being adjacent said lens of said housing.

2. The in-grade light fixture of claim 1 further comprising a lens ring surrounding said lens of said housing and in sealing engagement with said lens, said lens having a lens gasket interposed between said lens and said housing.

3. The in-grade light fixture of claim 1 further comprising a plurality of wires extending from said side car junction box through a potting dam of said side car junction box and through said hydraulic isolation chamber to said receptacle, said wires surrounded by a potting material thereby encasing said wires within said hydraulic isolation chamber.

4. The in-grade light fixture of claim 3 wherein said wires are exposed at said receptacle, said receptacle having an open pin interface extending into said hydraulic isolation chamber, said wires electrically connected to said pin interface.

5. The in-grade light fixture of claim 1 wherein said ballast box is a potted ballast box having potting material encased therein.

6. The in-grade light fixture of claim 1 wherein said lamping module is surrounded by a gimball mechanism and multi-directionally retained within said housing.

7. An in-grade light fixture, comprising:

a housing having a side wall and a bottom wall forming a main compartment therein and also having a lens at a top open end in scaling engagement with said side wall;

a splice compartment adjacent said lens of said housing having a removable splice compartment cover, said splice compartment cover adjacent said lens and sealingly engaging said splice compartment, said splice compartment having a potting dam at a lower end thereof;

a potting compartment extending vertically downward from said potting dam of said splice compartment to a receptacle extending through the side wall of said housing, said potting compartment having a plurality of wires extending from said splice compartment to said receptacle, said potting compartment filled with a potting compound and encasing said wires, said wires electrically connected to said receptacle;

a lamping module positionally adjustable within said housing and retained within said housing, said lamping module having a lamp, a lamp socket and a reflector surrounding said lamp, said lamp socket electrically connected to a socket receptacle on a lower end;

said socket receptacle of said lamping module in electrical connection to said receptacle in said potting compartment.

8. An in-grade light fixture, comprising:

a housing having an upper end covered by a lens in sealing engagement with said housing;

a side car junction box adjacent said lens and having an upper end covered by a junction box cover in sealing engagement with said side car junction box;

a vertically extending hydraulic isolation chamber in pathway communication with said side car junction box and extending to a lower end of said housing and further having a receptacle extending through said housing and having a pin interface exposed to said vertically extending hydraulic isolation chamber, a lamping module retained within said housing and having a top open end covered by a lamping module lens, said lamping module further having a lamp socket and lamp;

a ballast box within said housing in electrical communication with said lamp socket and said receptacle in said vertically extending hydraulic isolation chamber;

said side car junction box cover being adjacent said lens of said housing.

9. An in-grade light fixture, comprising:

a housing having a side wall and a bottom wall forming a main compartment therein and also having a lens at a top open end in sealing engagement with said side wall;

a side-car junction box adjacent said lens of said housing having a junction box cover, said junction box cover adjacent said lens and sealingly engaging said junction box, said junction box having a moisture barrier at a lower end thereof;

a potting compartment extending downward from said moisture barrier of said junction box to an electrical conduit extending through the side wall of said housing, said electrical conduit being in electrical connectivity through said potting compartment to said junction box, said potting compartment filled with a moisture barrier compound;

a lamping module interior to said housing and retained within said housing, said lamping module having a lamp, a lamp socket and a reflector surrounding said lamp, said lamp socket electrically connected to said receptacle in said potting compartment.

10. An in-grade light fixture with a vertically extending hydraulic isolation chamber, comprising:

a housing having a side wall and a bottom wall forming a main compartment therein and also having a lens at a top open end in sealing engagement with said side wall;

a vertically extending hydraulic isolation chamber extending vertically downward from a side car junction box adjacent said lens, to a receptacle extending through the side wall of said housing, said vertically extending hydraulic isolation chamber having a plurality of wires extending from said side care junction box to said receptacle, said vertically extending hydraulic isolation chamber filled with a potting compound and encasing said wires, said wires electrically connected to said receptacle;

said junction box adjacent said lens of said housing and having a removable junction box cover positioned along a horizontal plane substantially equal to said lens.

* * * * *